(12) United States Patent
Harmon, Sr.

(10) Patent No.: US 12,012,091 B2
(45) Date of Patent: Jun. 18, 2024

(54) INTERNAL COMBUSTION ENGINE POWERPLANT HAVING HIGH EFFICIENCY WASTE ENERGY RECOVERY AND DISTRIBUTION

(71) Applicant: Thermal Power Recovery LLC, Mahtomedi, MN (US)

(72) Inventor: James V. Harmon, Sr., Mahtomedi, MN (US)

(73) Assignee: THERMAL POWER RECOVERY LLC, Mahtomedi, MN (US)

( * ) Notice: Subject to any disclaimer, the term of this patent is extended or adjusted under 35 U.S.C. 154(b) by 0 days.

(21) Appl. No.: 18/134,457

(22) Filed: Apr. 13, 2023

(65) Prior Publication Data

US 2023/0331214 A1 Oct. 19, 2023

Related U.S. Application Data

(60) Provisional application No. 63/372,901, filed on Apr. 13, 2022.

(51) Int. Cl.

| | |
|---|---|
| *B60K 6/26* | (2007.10) |
| *B60K 1/00* | (2006.01) |
| *B60K 6/387* | (2007.10) |
| *B60L 7/10* | (2006.01) |
| *B60W 10/06* | (2006.01) |
| *B60W 20/40* | (2016.01) |
| *F01L 9/20* | (2021.01) |

(Continued)

(52) U.S. Cl.
CPC ............... *B60W 20/40* (2013.01); *B60K 1/00* (2013.01); *B60K 6/26* (2013.01); *B60K 6/387* (2013.01); *B60L 7/10* (2013.01); *B60W 10/06* (2013.01); *F01L 9/20* (2021.01); *F02D 13/0215* (2013.01); *F02D 13/06* (2013.01); *F02G 5/02* (2013.01)

(58) Field of Classification Search
CPC ......... B60W 20/40; B60W 10/06; B60K 1/00; B60K 6/26; B60K 6/387; B60L 7/10; F01L 9/20; F02D 13/0215; F02D 13/06; F02G 5/02
See application file for complete search history.

(56) References Cited

U.S. PATENT DOCUMENTS

| | | |
|---|---|---|
| 2,737,014 A | 3/1956 | Bush |
| 4,148,192 A | 4/1979 | Cummings |

(Continued)

*Primary Examiner* — John D Walters

(57) ABSTRACT

Although internal combustion engines typically waste about 75% of their fuel energy, this invention can provides 31% or more brake horsepower than the engine alone by using anhydrous organic racing engine coolant or other anhydrous organic heat transfer fluid arranged to spiral around a combustion chamber until heated to over 250° C. without boiling while exceeding the boiling point of a separate working fluid that is heated by coolant then superheated by exhaust gas before entering a unique positive displacement vapor expander engine having a piston connected by a clutch to a driveshaft that is also driven by the combustion engine to create a high efficiency direct mechanical powertrain which avoids losses of about 15% had a generator charged a battery powering an electric motor-generator connected for regenerative braking to charge batteries. Highly elevated coolant temperatures also reduce cylinder and exhaust temperatures to lower emission toxicity while preventing lubricant burnout.

26 Claims, 6 Drawing Sheets

(51) Int. Cl.
  *F02D 13/02* (2006.01)
  *F02D 13/06* (2006.01)
  *F02G 5/02* (2006.01)

(56) References Cited

U.S. PATENT DOCUMENTS

| | | |
|---|---|---|
| 4,470,476 A | 9/1984 | Hunt |
| 6,209,672 B1 * | 4/2001 | Severinsky ............ B60K 6/442 |
| | | 180/65.23 |
| 6,725,662 B2 * | 4/2004 | Baba ....................... F02B 41/10 |
| | | 60/670 |
| 7,117,691 B2 * | 10/2006 | Taniguchi ............. F01K 23/065 |
| | | 60/645 |
| 7,997,080 B2 | 8/2011 | Harmon, Sr. |
| 8,061,140 B2 | 11/2011 | Harmon, Sr. |
| 8,109,097 B2 | 2/2012 | Harmon, Sr. |
| 8,448,440 B2 | 5/2013 | Peoples et al. |
| 8,661,817 B2 | 3/2014 | Harmon, Sr. et al. |
| 9,316,130 B1 | 4/2016 | Harmon, Sr. et al. |
| 9,605,600 B2 * | 3/2017 | Zhang ................. F02D 13/0234 |
| 9,784,147 B1 | 10/2017 | Harmon, Sr. |
| 9,828,886 B1 | 11/2017 | Harmon, Sr. |
| 10,273,840 B1 | 4/2019 | Harmon, Sr. |
| 10,556,737 B2 | 2/2020 | Harmon, Sr. |
| 10,774,645 B1 | 9/2020 | Harmon, Sr. |
| 2016/0265393 A1 * | 9/2016 | Fleszar .................... F01K 5/00 |

* cited by examiner

INTERNAL COMBUSTION ENGINE POWERPLANT HAVING HIGH EFFICIENCY WASTE ENERGY RECOVERY AND DISTRIBUTION

RELATED APPLICATIONS

The present application claims the benefit of U.S. Provisional Application No. 63/372,901, entitled MEANS SUSTAINING HIGH EFFICIENCY POWER DISTRIBUTION FROM AN INTERNAL COMBUSTION ENGINE AND WASTE HEAT FROM THE ENGINE, and filed Apr. 13, 2022, said application being hereby incorporated herein in its entirety by reference.

TECHNICAL FIELD

The invention relates to internal combustion engines, and more particularly, maximizing waste heat recovery (WHR) from an internal combustion engine (ICE), and to efficient distribution of both the engine power itself, and the supplemental energy recovered.

BACKGROUND

Various kinds of energy recovery and distribution powertrains have been proposed or are in commercial use in ICE equipped vehicles having more than one source of power. There still exists, however, a significant waste of power in such vehicles. Such a system must be flexible under various driving conditions and efficient in its ability to transfer energy from all sources to the wheels of the vehicle without a significant loss.

In city driving for example, the throttle setting is continuously adjusted by the driver (or by a driverless system) causing the engine to idle several times a minute to accommodate changing driving conditions. When driving on an interstate highway at cruising speed, the vehicle may run for extended periods of time at 60-80 MPH with the throttle held at a more-or-less stationary setting while the ICE is running at about 2000-2500 RPM. Occasionally, the throttle is closed entirely, causing the engine speed to drop to an idling speed of around 800 RPM. With supplemental power supplied from both the ICE and an electric generator, it is not always possible to maintain power distribution efficiency while having to connect and disconnect multiple power sources to the wheels as power output and RPMs vary somewhat randomly for both the ICE and supplemental power sources. If a third power source is added, for example a vapor expander, efficient power transfer must be provided for all three different sources of power to achieve maximum efficiency.

The importance of reducing toxic emissions and greenhouse gases is shown by the commitment of the United States to a 50% reduction in greenhouse gas emissions by the year 2030. Although U.S. Government agencies and some vehicle producers claim to be committed to 100% electric vehicles (EV), it is estimated that, by 2030, the U.S. will still produce about 30% ICE vehicles primarily due to high EV and battery prices, limited travel range, and recharging infrastructure. A 30% production rate translates to about 68,000,000 new ICE vehicles produced in the U.S. between 2023 and 2030. Therefore, the current trajectory of transition would generate many tons of CO2 and other emissions every day. As a result, due to this relatively slow transition to electric vehicle use, ICE efficiency remains today (2023) an issue of paramount importance.

U.S. Pat. Nos. 8,061,140, 8,448,440, 8,661,817, 9,316,130, 10,273,840 and 10,774,645, all assigned to the Applicant's Assignee and hereby fully incorporated herein by reference, disclose WHR from an ICE that can be used to power vehicles. What is needed in the industry are further improvements in efficiently collecting and using waste energy that is recovered while distributing power produced by an ICE.

SUMMARY

Embodiments of the present invention address the need in the industry for further improvements in efficiently collecting and using energy that is recovered while distributing power produced by ICE and WHR.

Internal combustion engines (ICE) typically lose over 75% of the fuel energy primarily through waste heat given off by the radiator and exhaust gas. In addition to this loss, the toxic exhaust gas emissions and greenhouse gases contribute to a faltering environment. Although previously no more than 8% of the waste ICE energy could be reliably recovered, an ICE using the technology described herein has been found capable of developing 31% greater brake horsepower than the engine alone (a 390% improvement). This higher level of efficiency is begun by using a non-aqueous (anhydrous) organic engine coolant that preferably spirals rapidly around each combustion chamber of the engine until reaching a substantially elevated temperature e.g. over 200° C. without boiling but exceeding the boiling point of a separate working fluid that is then heated by the coolant in a heat exchanger and subsequently superheated by the engine exhaust gas before entering a novel high efficiency Rankine cycle vapor expander or engine having a piston that is operatively associated with one or more clutches such as a friction clutch or overrunning (one-way) clutch to impart rotation to a drive element such as a driveshaft.

In one relatively simple form of the present invention, a programmable electric engine controller of known construction regulates a clutch that is connected between an ICE and a WHR Rankine cycle expander which has an electric generator or motor-generator connected to the expander crankshaft and preferably an automatic transmission between the ICE and an output shaft. The term "motor-generator" herein refers to an electrically powered motor having a rotor and field or stator coils and acts as a motor when provided with electric current but also generates electric current when the rotor revolves.

In other forms of the invention a driveshaft transfers virtually 100% of the power produced from the waste heat of the expander to any load, for example, to power a vehicle while at the same time power produced by the ICE itself is also being transferred to the load through a second clutch to the same driveshaft.

In one form of the invention the rotational speed of an overrunning clutch accelerates rapidly until reaching that of the driven element when an associated electrically operated friction clutch is actuated by a computerized engine control unit (ECU). In this way the driven element or driveshaft which in a typical application is connected to the wheels of the vehicle is able to rotate freely, even though both power sources are stopped and vice versa. Thus, both power sources can rotate freely when the wheels are motionless by disengaging the friction clutches. In addition, both power sources as well as power from a motor-generator can impart power to the driveshaft simultaneously or independently when the rotational speed of each reaches that of the drive element or shaft to be engaged by a one-way clutch. Transferring the 31% recovered power together with 100% of the original ICE power in this way through a direct mechanical connection between the power sources and the wheels of a vehicle provides a transmission efficiency approaching 100% compared to a loss that may be around 12-15% when the vapor expander is used to charge a battery that is in turn used to power an electric motor to rotate the driveshaft and vehicle wheels. Because the drivetrain economies of the invention are able to sustain the 31% fuel saving under most driving conditions, the exhaust gas emissions would therefore be lowered about 30% and possible more with the invention installed in the 68,250,000 combustion vehicles now estimated by scientists to be produced in the U.S. in the interim between 2023 and 2030 in spite of the trend toward electric vehicles.

Scientists have also found that WHR technology of the kind used as part of the present invention is able to provide 31% more brake horsepower than the engine alone. The technology described in the present patent application therefore has the potential by the year 2030 of reducing carbon dioxide introduced into the atmosphere by about 74,200,000 metric tons annually from vehicles produced in the U.S. between 2023 and 2030 (0.31/1.31 increased brake horsepower×4.6 metric tons per US vehicle annually×68,250,000 estimated gasoline and diesel powered cars and trucks produced in the U.S. between now and 2030), reducing carbon footprint and saving lives. The utility and urgent need to commercialize the present invention is therefore apparent.

The importance of reducing toxic emissions and greenhouse gases is shown by the commitment of the United States to a 50% reduction by the year 2030. The present invention lowers emissions not only by reducing the quantity of fuel consumed by at least 30% per horsepower-hour, but also by reducing operating temperatures, since the percentage of toxic gases generally increases at higher combustion temperatures. The circuitous coolant duct system shown in FIG. 2 by increasing coolant turbulence when spiraling around the combustion chamber as well as the increased cylinder wall surface area provide a substantially greater heat transfer rate across the cylinder wall sustaining a lower inside cylinder wall temperature and a corresponding reduction in effective exhaust gas temperature; (Tgas) of over 100° C. due to increased heat rejection to the coolant. For example, in one ICE test, the CO2 concentration of 79 PPM at 200° C. coolant temperature dropped to 62 PPM at 100° C. With an indicated 58% coolant temperature reduction, the invention then generates an indicated 56 PPM which would be reduced by an additional 30% due to the reduction in fuel burned.

Although U.S. Government agencies and some vehicle producers claim to be committed to 100% electric vehicles (EV), scientists estimate that by 2030 the U.S. will still produce about 30% gas engine vehicles primarily due to high EV and battery prices, the limited travel range, and recharging infrastructure. The 30% production rate translates to about 68,000,000 new combustion vehicles produced in the U.S. between 2023 and 2030 that would generate tons of emissions every day much of which the present invention could eliminate during the interim leading to 100% EV production.

A variety of known or commercially available ICE and vehicular electronic control units (ECU) can be used with the present invention, each programmed somewhat differently depending upon the ICE being used and the sensors employed as well as the commercial application, whether for a sports car a sedan, limousine, or long haul freight truck powered by a diesel engine.

In an embodiment, a powerplant includes an internal combustion engine having an engine crankshaft, a driveshaft operably coupling the engine crankshaft to a load, and a vapor expander. The vapor expander includes a vapor expander crankshaft, a vapor expander cylinder, and a vapor expander piston slidable in the vapor expander cylinder and operably coupled to the vapor expander crankshaft. The vapor expander receives waste heat energy from the internal combustion engine. The powerplant further includes an electric generator having a plurality of stator coils and a rotor, the electric generator operatively coupled with the vapor expander crankshaft, a clutch operatively coupling the engine driveshaft and the vapor expander crankshaft, and an electrical controller adapted to engage and disengage the clutch depending on the load applied through the driveshaft.

In an embodiment, the powerplant can be part of a motor vehicle having at least two wheels. The driveshaft drives at least one of the two wheels. The vapor expander crankshaft applies torque through the clutch to the driveshaft, thereby enabling energy produced by both the internal combustion engine and the vapor expander to be transferred to the at least one wheel, and when the load is removed and when the clutch is engaged, momentum energy of the motor vehicle is transferred from the at least one wheel to drive the electric generator to provide regenerative braking as the motor vehicle decelerates. The electric generator can be a motor-generator operatively coupled to drive the at least one wheel, and the powerplant can further include an electric battery chargeable by the motor-generator.

In an embodiment, the powerplant can include a vapor expansion chamber disposed between the vapor expander piston and a vapor expander cylinder head, the vapor expander cylinder head supported in a fixed position by a cylinder block of the internal combustion engine.

In an embodiment, the powerplant can include a double-acting piston slidably disposed in an engine cylinder supported by a cylinder block of the internal combustion engine, the internal combustion engine having a combustion chamber defined by the double acting piston, the engine cylinder, and a cylinder head of the internal combustion engine, the vapor expander including a vapor expander cylinder head supported by the engine block, a vapor expansion chamber being disposed within the double-acting piston and defined by the vapor expander cylinder head, the vapor expander cylinder, and the vapor expander piston. The vapor expander cylinder head can include a vapor inlet valve and a vapor exhaust valve, wherein at least one of the vapor inlet valve and the vapor exhaust valve is biased during operation by pressurized vapor. An electronic control unit having a cutoff timing regulator can be operatively coupled to the vapor inlet valve. The electronic control unit can enable selection of a closing time of the vapor inlet valve by controlling pressure in a cavity in fluid communication with the vapor inlet valve.

In an embodiment, the clutch can be an electromagnetically engageable clutch. In a further embodiment a second clutch is disposed between the vapor expander and the driveshaft, and a third clutch between a motor-generator and the driveshaft.

In an embodiment the vapor expander operates on a Rankine cycle.

In a further embodiment of the invention, a vehicle includes a vehicle framework supported by at least two wheels, an internal combustion engine, and a vapor expander having a vapor expander cylinder with a piston slidably mounted thereon. A vapor expansion chamber is defined by the piston and the vapor expander cylinder, the vapor expansion chamber receiving vapor heated by waste thermal energy from the internal combustion engine. A one-way clutch operatively couples the vapor expander to drive at least one of the at least two wheels, and a second clutch is connected between the internal combustion engine and the at least one wheel. The vehicle further includes a power output controller operatively connected to at least one member selected from the group consisting of the internal combustion engine and the vapor expander such that the power output controller regulates power supplied to the at least one wheel, whereby the vapor expander and the internal combustion engine can simultaneously, as well as independently, drive the at least one wheel of the vehicle.

In an embodiment, the vehicle includes a driveshaft operatively coupled between the internal combustion engine and the at least one wheel, and a dual clutch transmission is connected between the driveshaft and the at least one wheel. The piston can be operatively coupled by a connecting rod to impart rotation to a generator, wherein the vapor expander includes a cylinder head having a pair of valves comprising a vapor inlet valve and a vapor exhaust valve communicating with the vapor expansion chamber. The vehicle can further include at least one timing adjustment element to regulate the closing time of the vapor inlet valve relative to the location of the piston in the cylinder.

In a further embodiment, an energy generating and transfer apparatus for waste heat recovery to power an output shaft for imparting mechanical work to a load includes an internal combustion engine having an engine block supporting an engine cylinder, an engine piston slidably received in the engine cylinder, and a driveshaft. A vapor expander is operatively associated for receiving waste heat energy from the internal combustion engine and to convert to the waste heat energy to mechanical work by imparting rotation to an output member. The vapor expander includes a vapor expander cylinder with a vapor expander cylinder head at an outward end thereof, with the vapor expander cylinder head supported from the engine block. A vapor expander piston is slidably received upon the vapor expander cylinder. The vapor expander cylinder head, the vapor expander cylinder, and the vapor expander piston define a vapor expansion chamber. A vapor inlet valve and a vapor exhaust valve are supported within the vapor expander cylinder head, each such vapor inlet valve and vapor exhaust valve being biased during operation to a predetermined position. Each vapor inlet valve and vapor exhaust valve have a valve actuator extending outwardly therefrom for sliding into a recess in the crown of the engine piston to thereby impart inward movement to actuate each vapor inlet valve and vapor exhaust valve by piston motion as the engine piston approaches a bottom dead center position.

The apparatus can be mounted in a motor vehicle having at least two wheels, the vehicle being powered by the internal combustion engine coupled to drive at least one wheel of the vehicle, and the vapor expander can be powered by vapor heated by waste heat from a coolant of the internal combustion engine and by waste heat from internal combustion exhaust gas. The vapor expander can be operatively associated to drive at least one of the vehicle wheels.

In a further embodiment, an energy generating and transfer system for waste heat recovery includes an internal combustion engine having at least one cylinder with a piston slidably mounted therein that is connected to an engine crankshaft for applying torque to a load, and a vapor expander operatively associated with the internal combustion engine to produce mechanical energy from waste heat recovered from the internal combustion engine. The vapor expander can have a vapor expander cylinder and a vapor expander piston slidably mounted therein and connected to a vapor expander crankshaft. The system further includes an electric generator having a rotatable magnetic rotor connected to the vapor expander crankshaft, the generator having at least one stator coil, and a controller connected to operate a clutch for transmitting power from the vapor expander crankshaft to a rotatable driving element for applying torque to the load, the controller being arranged to open an electrical circuit through the stator coils of the generator when the clutch is engaged thereby cutting off the flow of current from the generator, whereby the vapor expander produces increased mechanical power through the clutch to drive the load during a rotation of the rotor.

The rotatable driving element for applying torque to a load can be coupled by a mechanical drive member to the engine crankshaft such that both the internal combustion engine and the vapor expander thereby apply power to the load simultaneously.

The energy generating and transfer system can be mounted in a motor vehicle that is supported by at least two wheels, the engine crankshaft operatively connected to drive at least one of the wheels for imparting motion to the vehicle and a mechanical connection from the expander crankshaft applying torque through the clutch to the engine crankshaft, enabling substantially all of the energy produced by both the internal combustion engine and the vapor expander to be transferred to the at least one of the vehicle wheels, whereby momentum energy of the vehicle can be transferred by a mechanical connection from the at least one wheel to drive the generator for providing regenerative braking while the clutch is engaged.

In a further embodiment, an energy generating and transfer apparatus for waste heat recovery includes an internal combustion engine having at least one cylinder with a double acting piston slidably mounted therein connected to drive a crankshaft, the cylinder having a combustion chamber on one side of the piston and an expansion chamber on the other side thereof powered by pressurized vapor heated by waste heat from the engine. An electric generator is releasably connected and driven by the crankshaft connected to the double acting piston. A controller can be operatively associated with the engine to disable at least one combustion inlet valve and at least one combustion exhaust valve when the double acting piston crankshaft is connected to drive the electric generator, thereby reducing a drag force from the engine acting upon the motion of the double acting piston.

In a further embodiment, an energy generating and transfer apparatus for waste heat recovery for a motor vehicle includes at least a pair of wheels to support a motor vehicle, an internal combustion engine, and a vapor expander operatively associated with the engine to produce mechanical energy from waste heat recovered from the engine. The engine and the vapor expander are operatively associated to power the driveshaft independently when only one of the engine and the expander is powered and to power the driveshaft simultaneously when the engine and expander are both powered. The apparatus can further include a motor-generator having a magnetic rotor and a plurality of stator coils, a plurality of clutches including cooperating clutch members that during operation connect the driveshaft to the rotor for generating electric current and additional clutch members that connect the motor-generator to at least one of the vehicle wheels thereby providing regenerative braking when the vehicle decelerates.

In a further embodiment, an energy generating and transfer apparatus for waste heat recovery includes an internal combustion engine having a driveshaft for connecting the engine to a load and a Rankine cycle vapor expander having a crankshaft and a cylinder with a piston slidably mounted therein for imparting rotation to the expander crankshaft. The expander is operatively associated to receive waste heat energy from the internal combustion engine and to convert the waste heat energy to mechanical work. The internal combustion engine has at least one inlet valve and at least one exhaust valve, and an electronic controller operatively connected to time independent operation of the inlet and the exhaust valve and to deactivate operation of at least one of the internal combustion valves at selected times. The electronic controller can be operatively connected to regulate at least one of the opening and the closing of at least one of the internal combustion valves and to deactivate at least one of the internal combustion valves when the load on the internal combustion engine is reduced. At least one internal combustion valve can be opened by a cylindrical valve body connected thereto that is regulated by the electronic controller and the at least one internal combustion valve can be closed by an electromagnet that is regulated by the electronic controller.

Having made such a full, clear and concise disclosure of the invention as provided herein to enable those skilled in the art to make and use the same, it will also be apparent to those skilled in the art to provide any of a variety of known manual controls for operating valves, pumps, clutches and the like or alternatively select and program a known or commercially available ECU to meet the circumstances and requirements encountered for use with a specific vehicle or other application. Although there is described herein a specific arrangement of controls and power sources including engines, expanders, motor-generators and a vehicle propulsion system in accordance with the invention, it will be appreciated that the invention is not limited thereto. Therefore all modifications and variations of equivalent arrangements that are apparent to those skilled in the art should be considered to be within the scope of the invention as defined in the appended claims.

The above summary is not intended to describe each illustrated embodiment or every implementation of the subject matter hereof. The Figures and the detailed description that follow more particularly exemplify various embodiments.

BRIEF DESCRIPTION OF THE DRAWINGS

The subject matter hereof may be more completely understood in consideration of the following detailed description of various embodiments in connection with the accompanying Figures, in which.

Figure 1:
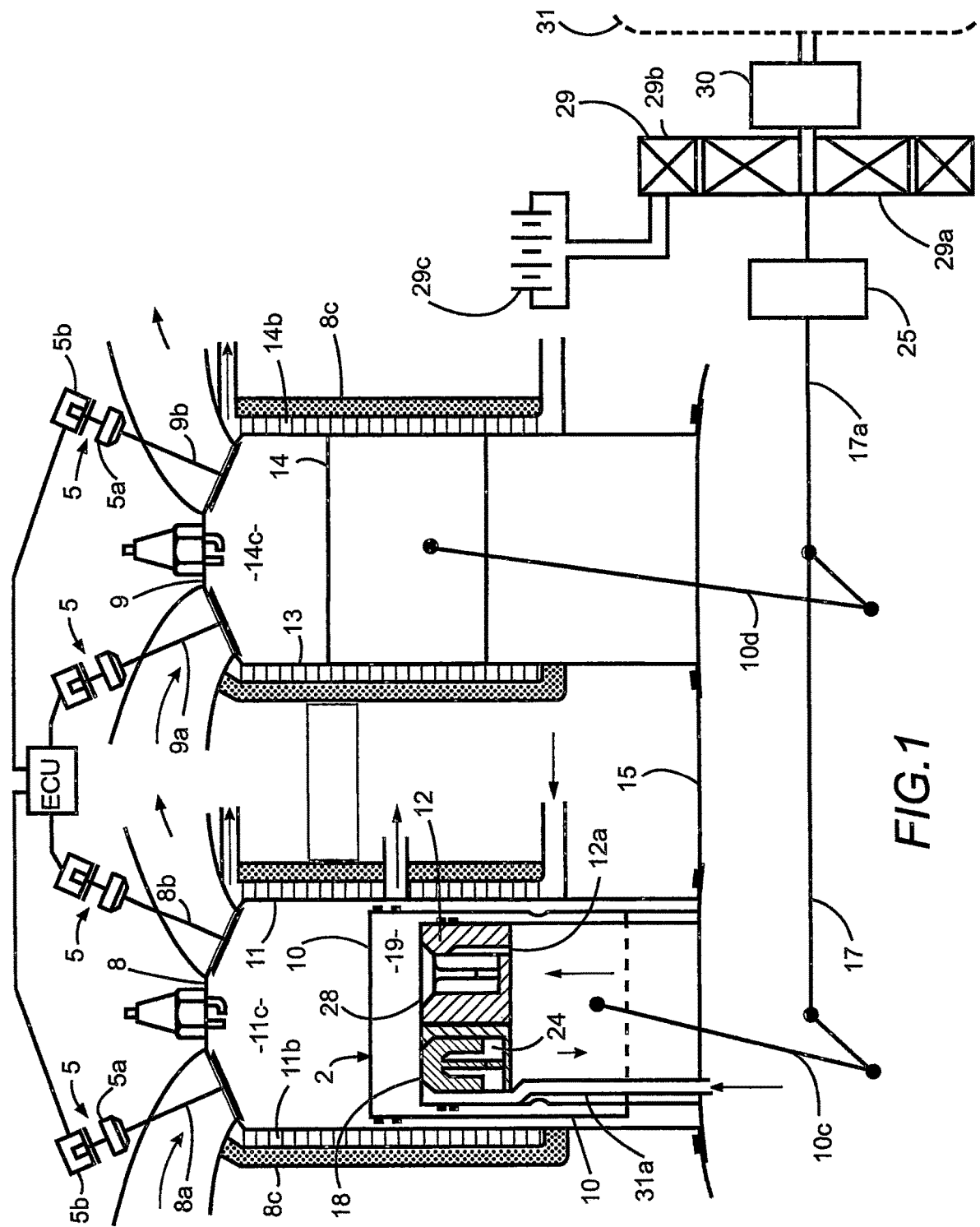
FIG. 1 is a partial schematic side elevation view, partly in section, which shows an internal combustion engine having a vapor expander and a motor-generator providing three sources of mechanical power and the accompanying drivetrain in accordance with an embodiment of the invention.

While various embodiments are amenable to various modifications and alternative forms, specifics thereof have been shown by way of example in the drawings and will be described in detail. It should be understood, however, that the intention is not to limit the claimed inventions to the embodiments described. On the contrary, the intention is to cover all modifications, equivalents, and alternatives falling within the spirit and scope of the subject matter as defined by the claims.

DETAILED DESCRIPTION OF THE DRAWINGS

Unlike hybrid vehicles now in current use that are powered by an internal combustion engine and batteries which supply power to a motor-generator, embodiments of the invention described herein have at least two variable-speed supplemental power sources, namely a vapor expander powered by waste heat from the ICE as well as a motor-generator.

The speed and power of the vapor expander can be much different from that of the ICE. For example, as the ICE first begins to warm up, the vapor expander is inactive until the ICE coolant and exhaust reach a threshold temperature sufficient to run the vapor expander. In contrast, prior energy recovery systems that use a vapor expander or regenerative braking to charge the batteries are not able to achieve high thermal efficiency under all driving conditions. Moreover, if the generator, the battery, and the motor-generator are each 95% efficient, the overall efficiency will be about 85% (95%×95%×95%). In contrast, the inventions described herein provide high efficiency energy recovery cooperating with a WHR drivetrain that is constructed and arranged to overcome these and other problems by transferring energy primarily through a direct mechanical connection as described in the following disclosure with reference to FIGS. 1-7.

Figure 2:
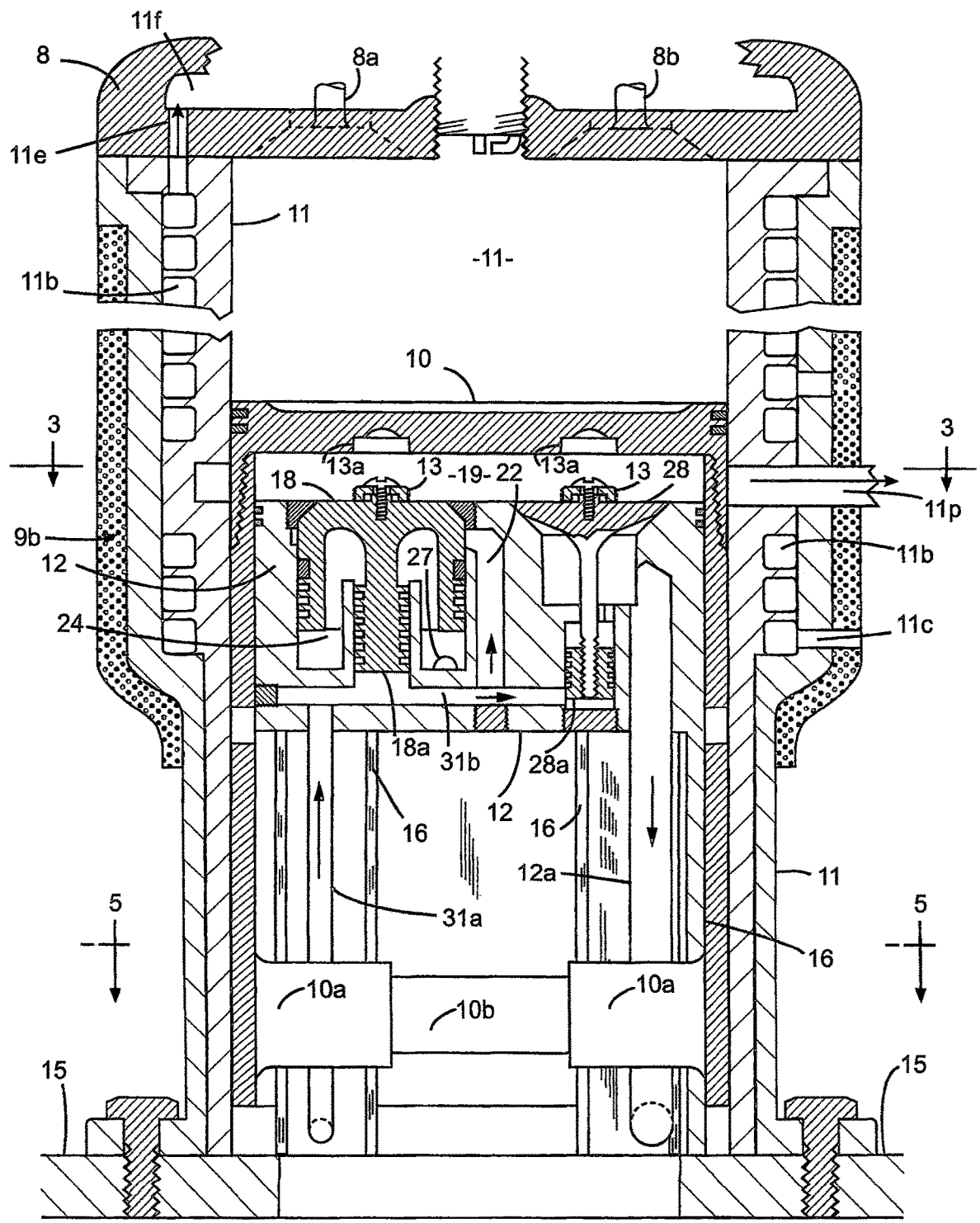
FIG. 2 is an enlarged vertical cross-sectional view of the left cylinder of the internal combustion/vapor expansion engine depicted in FIG. 1.
Figure 3:
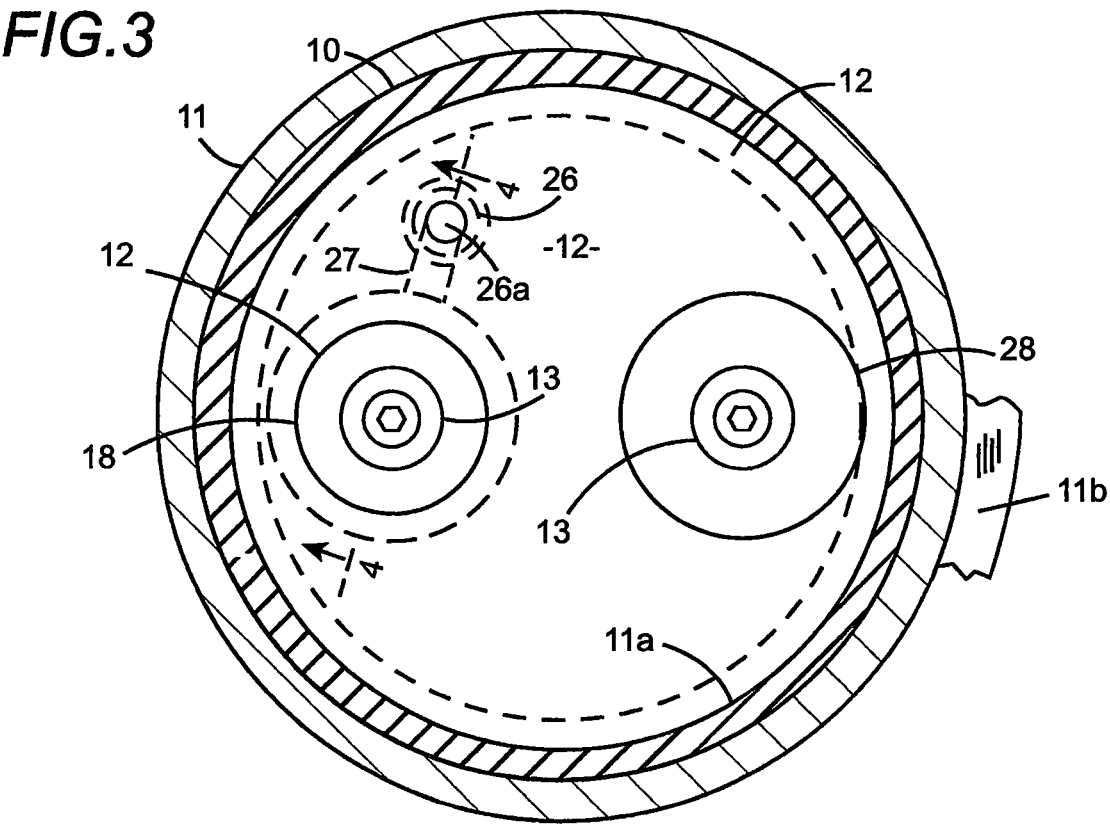
FIG. 3 is a partial horizontal cross-sectional view taken at Section 3-3 of FIG. 2.

FIGS. 1 and 2 depict schematically, by way of example, a compact form of a powerplant according to embodiments of the invention for efficiently recovering, as well as distributing, waste heat energy from an internal combustion engine. This form of the invention makes it possible to avoid the bulk and expense of adding an additional cylinder for recovery of heat energy.

The engine is a two cylinder dual cycle gasoline (or diesel) ICE and WHR engine having cylinders 11 and 13 with pistons 10 and 14 slideably and sealingly mounted therein that are coupled to a crankshaft 17 by connecting rods 10c and 10d. The piston 10 is a double acting piston having a somewhat elongated skirt slideably and sealingly mounted over an inner cylinder head 12 that is held rigidly spaced concentrically within cylinder 11 by being bolted at its inward end to an engine block 15 as shown in FIG. 2 and constructed generally as described in Applicant's Assignee's U.S. Pat. No. 8,448,440. Outer cylinder heads 8 and 9 are provided with inlet and exhaust valves 8a, 8b and 9a, 9b, respectively, all of which are constructed in any known manner so that they can be deactivated or held closed from time-to-time during operation by an engine control unit (ECU 6) of suitable known construction when the load has been removed from the engine. The vapor expander 2 (FIG. 1) is formed by the double acting piston 10 enclosing inner cylinder head 12 to define a Rankine or steam cycle vapor expansion chamber 19 above the inner cylinder head 12. The ICE combustion chamber 11c is located in cylinder 11 above piston 10. A second combustion chamber 14c is located in cylinder 11 above piston 14. Any number of cylinders can be provided. The crankshaft 17 is connected by means of driveshaft 17a through electromagnetic clutch 25 to a brushless motor-generator 29, and in this example is connected to an automatic transmission 30 and to a car or truck wheel hub 31.

With reference to FIG. 2 it will be seen that at the lower end of the piston 10 are bearings 10a for a wristpin 10b to which the connecting rod 10c is secured to transfer power to crankshaft 17 (FIG. 1). Within the inner cylinder head 12 is a vapor inlet valve 18 and an exhaust valve 28. As shown in FIG. 2, pressurized vapor flows upwardly to duct 31b through at least one duct 31a and is exhausted through duct 12a, both of which extend outwardly from the base of the cylinder 11 and engine block 15 from a heat exchanger (not shown) similar to 92 in FIG. 8. The vapor conveyed outwardly through duct 31a to 31b applies an outward force on both of two valve pistons 18a and 28a to bias the valves in an outward direction as well as conveying pressurized vapor to inlet valve 18 through duct 22 for pressurizing the vapor expansion chamber 19 when the inlet valve 18 is opened.

As depicted in FIG. 2, each valve is provided with an outwardly extending actuator or lifter 13 held on top of the piston crown with a fastener such as a screw that is aligned with an inwardly facing recess 13a in the inside surface of the crown of piston 10. Each actuator side walls is provided with circular circumferentially extending labyrinth grooves of known construction to impede leakage. During operation when the valve lifter 13 of the inlet valve 18 enters the recessed 13a as the piston slows to zero velocity at BDC, due to the pressure developed in recess 13-a, inlet valve 18 is lowered slightly off its seat causing a blast of supply steam to pressurize the vapor expansion chamber 19 while the piston clearance from the inner cylinder head 12 is reduced preferably to less than 0.125 inch and typically about 0.020 inch. The sudden rush of high-pressure vapor was shown during tests to drive the inlet valve fully open in less than 1 ms. by a vapor assist force (about 15 times faster than a camshaft at 2000 RPM) thus improving volumetric efficiency as pressurized vapor flows into the expansion chamber 19 through inlet duct 22. As the inlet valve is being opened the exhaust valve 28 is simultaneously closed in a similar manner by the exhaust lifter 13 entering opposing recess 13a and is then held closed during the power stroke by the steam pressure within the expansion chamber 19.

Figure 4:
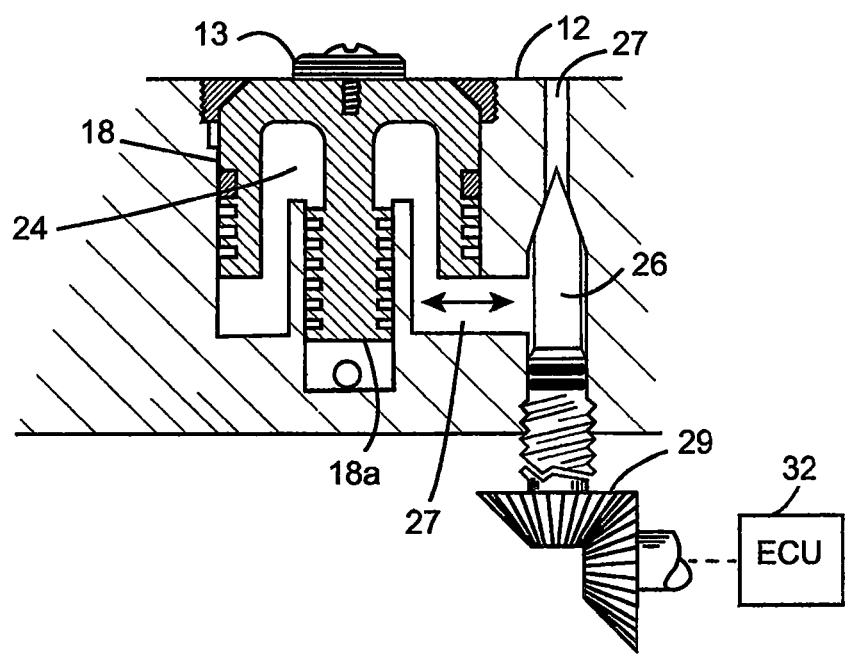
FIG. 4 is a partial vertical cross-sectional view taken at Section 4-4 of FIG. 3.

Vapor at supply pressure is applied to valve pistons 18a and 28a to keep the inlet valve normally seated and the exhaust valve normally open. The inlet valve 18 is also biased toward a closed position by the vapor in a cutoff timing control chamber 24 at a pressure regulated to maintain selected timing of the inlet valve closure so as to optimize the mass of vapor that is admitted into expansion chamber 19 under different operating conditions thereby maximizing thermal efficiency as driving conditions vary during operation. This is done with a metering needle valve 26 within duct 27 which is adjusted from time to time by the ECU 32 (FIG. 4). Continuous regulation of the metering valve 26 is programmed to select the time the flow of vapor entering expansion chamber 19 is cut off as it occurs during each outward power stroke of the piston. As shown in FIG. 4, ECU 32 is arranged to adjust the setting of metering needle valve 26 through a pair of bevel gears 26a and a stepper motor (not shown).

Figure 5:
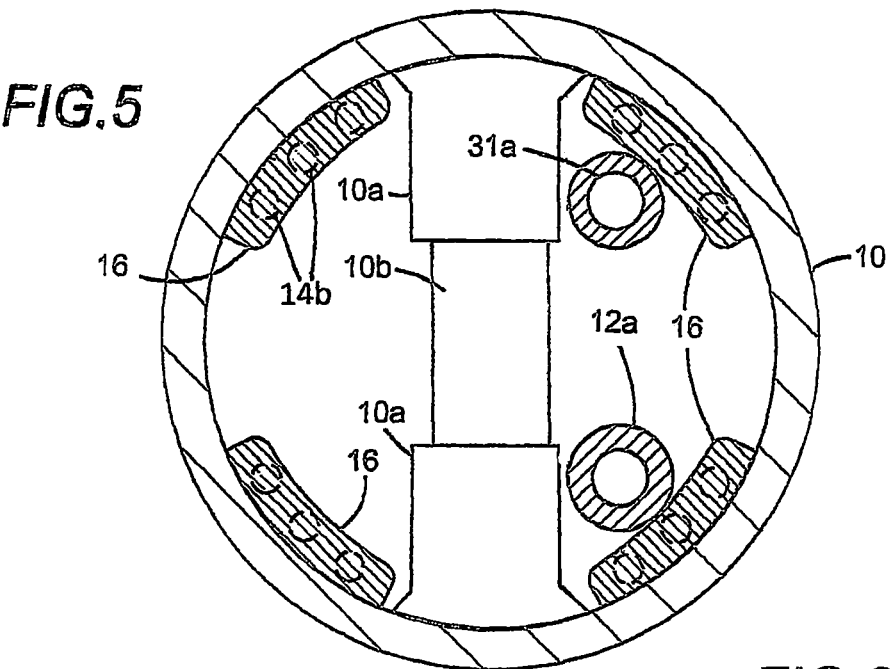
FIG. 5 is a partial horizontal cross-sectional view taken at Section 5-5 of FIG. 2.
Figure 6:
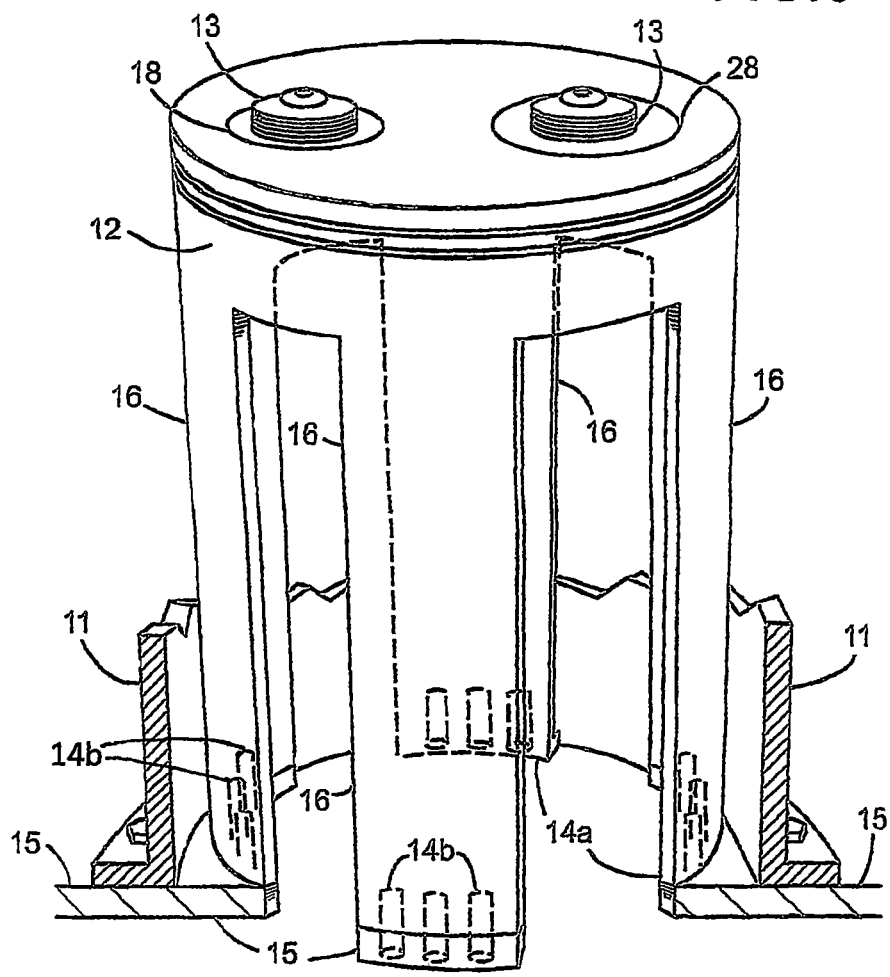
FIG. 6 is a perspective view, partly in section, of the inner cylinder head including supporting legs, and its orientation relative to an internal combustion engine block.

FIGS. 5 and 6 depict how the wristpin bearings 10a extend through openings between four legs 16 that support the inner cylinder head 12 and how the lower ends 14a of the legs 16 are secured to the engine block 15 by bolts 14b.

To achieve maximum efficiency, the exhaust valve 28 remains fully open during the exhaust stroke until closing pressure develops in its recess 13a. Vapor pressure in expansion chamber 19 prevents exhaust valve 28 from opening until uniflow port 11p is opened at the end of the power stroke. Using vapor pressure as described above to bias the inlet and exhaust valves outwardly eliminates the need for valve springs which have a limited life, due for example, to heat exposure. Lubrication can be provided by pressurized lubricant introduced through oil ducts (not shown) or by a lubricant spray dispersed in the working fluid vapor.

Lubricant failure due to overheating that could cause pistons scuffing is avoided by the circuitous coolant ducts 11b and 14b which spiral around the cylinders and may be 30 times the length of an ordinary cylinder cooling jacket that together with turbulent flow conditions result in a Reynolds number of a high order thereby reducing the cylinder temperature enough to avoid lubricant failure while at the same time enhancing the transfer of heat from combustion gas to the coolant. Operation of the inlet and exhaust valves as described above without physically bumping the piston or lifter can eliminate wear and noise as described in U.S. Pat. Nos. 10,273,840 and 10,774,645 previously incorporated herein by reference. The vapor expander valve mechanism described has another significant efficiency advantage since, unlike a cam system, it makes it possible to vary the inlet valve closing time, yet maintain a fixed opening time precisely at the end of the exhaust stroke thus preventing power robbing reverse torque that results from opening the inlet prior to BDC. Camshafts are inherently unable to accomplish this result. In this way the present invention helps to achieve and maintain a level of heat recovery as much as about 390% greater than the best previously known practical heat recovery systems while fuel consumption and exhaust gas output can be reduced about 31% or more.

During the time that most of the fuel is being consumed by a vehicle such as a car or truck powered by the present invention, for example while cruising on an interstate highway, there will be a load on the engine which enables virtually all of the pressurized vapor energy produced by the vapor expander 2 to be added to energy produced by internal combustion. Whenever the load is removed from the ICE, the deactivation of valves 8a, 8b and 9a, 9b by the ECU (FIG. 1) enables the vapor expander 2 alone to continue to operate. As long as vapor pressure remains above a nominal value such as 25 psig and the clutch 25 remains engaged, electric current continues to be produced by the motor-generator 29 for charging battery 29c or applying torque to the wheel hub 31.

Vehicle manufacturers have reported a 20% improvement in fuel mileage by deactivating four cylinders of an eight cylinder Otto cycle gasoline engine. While it is recognized that internal combustion efficiency is not equivalent to Rankine cycle efficiency, a first order analysis using those findings without the consideration of additional friction etc. indicates that the present invention under similar conditions while the engine has no power from combustion and all cylinders are deactivated, that the energy supplied by the present invention to the vapor expander 2 continues to add about 40% of its power output to the driveshaft (100×20/50=40). However, under typical driving conditions when most of the fuel is consumed with no cylinders deactivated, virtually all of the recovered energy applied to the driveshaft by the vapor expander 2 of FIG. 1 is added to that provided by the ICE. Considering cylinder deactivation itself with intake and exhaust valves closed, there is an equalizing effect of compression and decompression resulting overall in virtually no load on the engine.

During a warmup period, vapor expander 2 is not active. Following the warmup period, both the ICE and the vapor expander power the vehicle wheels. Throughout warmup of the engine depicted in FIGS. 1 and 2 and before significant vapor pressure develops, the ducts leading to both the inlet valve 18 and exhaust valve 28 of the vapor expander 2 are temporarily connected to a closed vapor receiving chamber (not shown). This prevents excessive pressure or fluid loss as the piston 10 reciprocates. Then following warmup, during normal operation of the vehicle, whenever the vehicle is cruising at a fairly constant speed, power is supplied to the wheels by means of the direct mechanical connection from the ICE with additional torque also being supplied by the vapor expander as previously described. However, when slowing down as the driver's foot is lifted from the accelerator and the load is removed from the engine, the ICE combustion chamber inlet and exhaust valves can be deactivated by ECU 6 using a commercially available engine valve deactivation mechanism (not shown) known to those skilled in the art as the electric generator 29 is simultaneously activated to charge the battery 29c by ECU programming that then connects the electric generator stator coils to the battery. The battery will then be charged by vapor expander 2 or by momentum energy through regenerative braking.

In a preferred form of the invention, instead of using a camshaft to operate valves, all of the internal combustion engine valves 8a-9b shown in FIG. 1 are electronically regulated by ECU 6 to be opened and closed at times that are independent of each other as well as deactivating the valves when the load on the ICE is reduced. ECU 6 controls the valve actuators 5 shown in FIG. 1 of the general kind described in the present Assignee's U.S. Pat. No. 9,784,147 which is incorporated herein by reference. Each valve actuator 5 has an electromagnet 5b and a cylindrical valve body 5a connected to each ICE valve. Each valve body 5a is slideably mounted within a valve cylinder (not shown). During startup of the engine, the valves 5 are opened and closed by the electromagnets 5b alone until the working fluid has reached sufficient pressure to power the movement of the valve bodies 5a so that the ECU 6 then regulates the valve bodies' 5a opening of the internal combustion valves at timed intervals based upon driving conditions while the electromagnets 5b close the internal combustion valves at timed intervals. Besides being able to deactivate ICE valves, the present invention's continuous independent valve timing regulation of both opening and closing based on driving conditions makes possible a reduction in mean specific fuel consumption as well as lowering toxic emissions.

Figure 7:
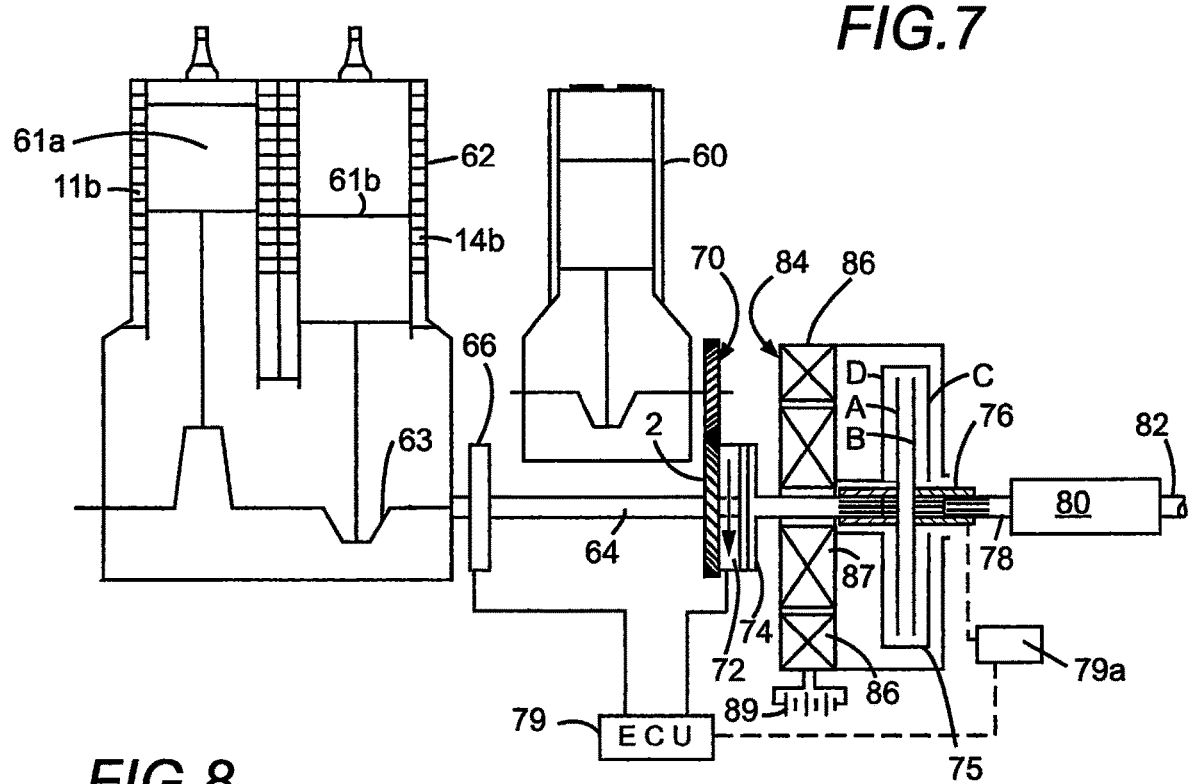
FIG. 7 is a schematic vertical sectional view of another form of waste heat recovery and distribution apparatus in accordance with an embodiment of the invention.

FIG. 7 illustrates schematically a vapor expander 60 powered by waste thermal energy recovered from an internal combustion engine 62 having an ordinary ICE piston 61a rather than a double acting piston as in FIG. 1. Crankshaft 63 is arranged in a drivetrain capable of efficiently supplying power to a load that varies under the kind of changing conditions which occur in a vehicle.

In FIG. 7, the crankshaft 63 of the engine 62 is connected to impart rotation to a driveshaft 64 through an electromagnetically actuated friction clutch 66 controlled by a suitable ECU 79a. Expander 60 imparts rotation to the driveshaft 64 through gear drive 70 including two gears that drive an electromagnetically actuated clutch 72 also controlled by ECU 79a that transmits power to driveshaft 64 only through an overrunning or one-way clutch 74 which rotates in the same direction as clutch 66. At the right or downstream end of driveshaft 64 is a multiple clutch 75 represented schematically by four clutch plates A, B, C and D. Plate A is splined to shaft 64. Plate B is connected to a movable splined clutch sleeve 76 slidably mounted on splined shaft 78 of automatic transmission 80 which in turn drives one or more vehicle wheels (not shown) through output shaft 82. Plate C and D are connected to rotor 87 of brushless motor-generator 84. When plate B is moved by ECU 79a into contact with plate A, expander 60, engine 62 and driveshaft 64 can drive the vehicle wheels through shaft 78, automatic transmission 80 and output shaft 82. Plate C is connected to magnetic rotor 87 of the motor-generator 84. When plate B is moved by ECU 79a into contact with plate C, the vehicle wheels are then able to drive motor-generator 84 to provide regenerative braking as the vehicle decelerates. Rotor 87 includes a ring of permanent magnets and a stator 86 including a ring of stator coils surrounding rotor 87.

ECU 79a is programmed to engage plate B with plate A to power the transmission 80 or to engage plate B with plate C to connect rotor 87 of motor-generator 84 to transmission 80 and wheels of the vehicle. When plate A is placed in contact with plate D by ECU 79a, expander 60 drives motor-generator 84 for charging a battery 89 even with engine 62 stopped or idling, as long as there is sufficient vapor pressure. Clutch plates A-D, as noted earlier, are schematic representations of any suitable known or commercially available clutch mechanism for providing the multiple engagement combinations shown.

During operation, either or both of engine 62 and expander 60 transmit power by direct mechanical connection through clutches 66, 72 and 74 to the vehicle wheels with nearly 100% efficiency under most driving conditions, while avoiding the combined losses of the three components; generator, battery and electric motor. A minute or two after startup, with the automatic transmission 80 in "drive" and superheated vapor supplied to the expander 60 above a threshold pressure, the crankshaft of expander 60 will begin to rotate and, upon reaching the speed of shaft 64, one-way clutch 74 will then supply waste heat energy to shaft 64 so that both engine power and expander power are transferred to the wheels with little loss due to the mechanical drive connection from expander to the wheels. However, when engine 62 is stopped or idling and the vehicle is decelerating, ECU 79a is programmed to connect plates A and D so that expander 60 will power motor-generator 84 through a mechanical connection for charging the battery or operating vehicle accessories as long as expander 60 continues to receive pressurized vapor. Whenever the vehicle is decelerating, ECU 79a is programmed to connect plates B and C as previously noted to provide regenerative braking as the wheels drive the motor-generator and the vehicle slows to a stop. It can therefore be seen that the engine, vapor expander and motor-generator are all able under a variety of driving conditions to power the vehicle working together or individually entirely through a direct mechanical connection drive. This ensures that there is relatively only a small loss of energy in transmitting power from engine 62 or expander 60 to the wheels under most common driving conditions. Automatic transmission 80 is provided with the customary selections for park, neutral, drive, reverse and three or more forward gears.

Figure 8:
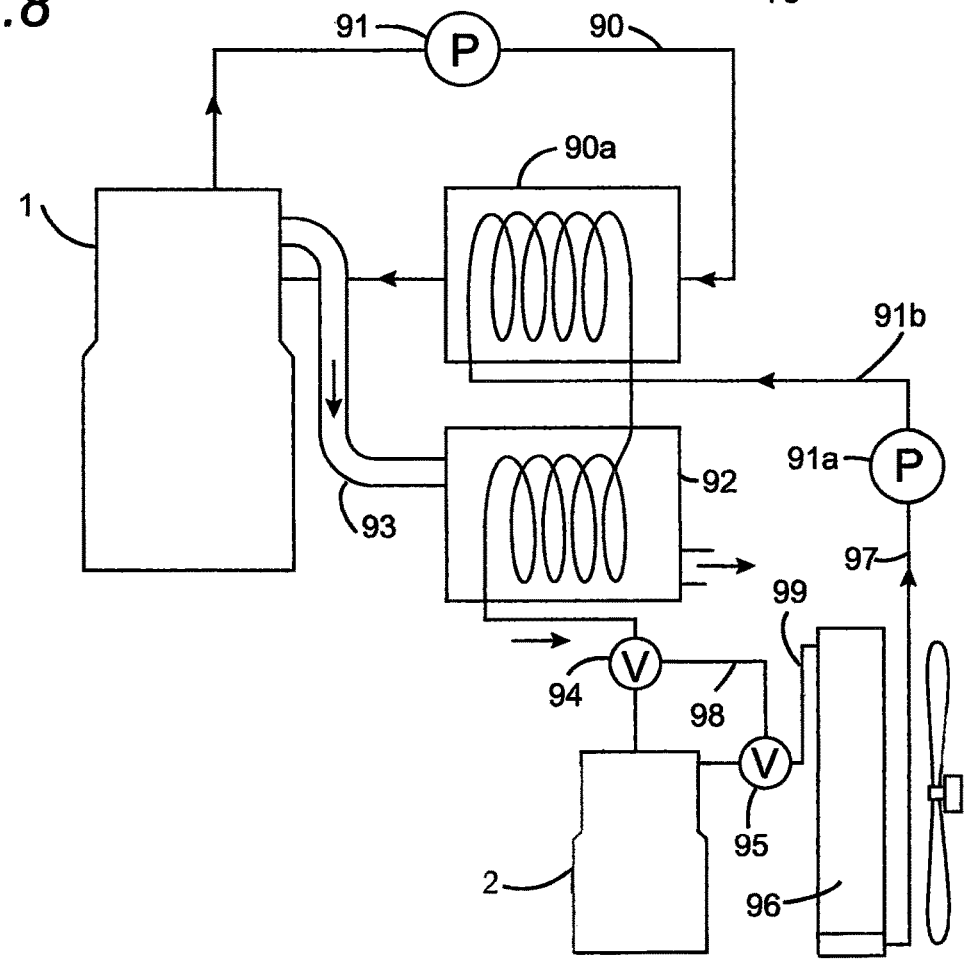
FIG. 8 is a schematic diagram showing transfer of energy from an internal combustion engine coolant to a working fluid and from the working fluid to a vapor expander according to an embodiment of the invention.

Refer now to FIG. 8 which depicts the transfer of thermal energy from either ICE 1 of FIG. 1 or 62 of FIG. 7 to either of their associated expanders 2 or 60, respectively. Coolant comprising a suitable anhydrous organic heat transfer fluid having a somewhat higher boiling point than water (e.g. ethylene glycol, propylene glycol, glycerol (BP 554° F.) or Duratherm G available from Duratherm Extended Life Fluids, Tonawanda, NY) is heated by the combustion chamber of ICE 1 or 62, as described above, preferably to over 200° C. but below its boiling point in closed circuit 90. Pump 91 circulates the coolant through counter-flow heat exchanger 90a then back to the helical cooling duct between fins of duct 11b of FIG. 2 where it is again heated and the cycle repeats. Second pump 91a circulates a working fluid, which may be a suitable organic Rankine cycle fluid of a relatively low boiling point below that of the coolant, such as ethanol or methanol, water or other aqueous solution such as a 50/50 mix of water and propylene glycol through pipe 91b to heat exchanger 90a. The fluid is heated by the coolant in heat exchanger 90a then passed through a second counterflow heat exchanger 92 where it is superheated by engine exhaust transferred from the engine through exhaust pipe 93 after passing through a catalytic converter (not shown). From heat exchanger 92, after flowing down through bypass valve 94, the superheated vapor enters vapor expander 2 of FIG. 1 or 60 of FIG. 7 where it converts heat and pressure into useful mechanical work that is transferred efficiently as described above to the wheels of a vehicle or other load. The vapor exits from expander 2 through second bypass valve 95 before passing through condenser 96, where condensate at the lower end of condenser 96 is drawn through return duct 97 by pump 91a to complete the endless circuit by again entering heat exchanger 90a to be reheated. This was found to provide an increase of 31% or more in brake power output than the engine 1 alone, therefore also a remarkable 31% reduction in exhaust gas per horsepower-hour. If the temperature or pressure of the vapor from heat exchanger 92 exceeds a pre-set limit, bypass valves 94 and 95 can be opened to temporarily allow the vapor to flow through bypass pipes 98 and 99 to condenser 97 or a cooling tank (not shown) connected to condenser 96.

Figure 9:
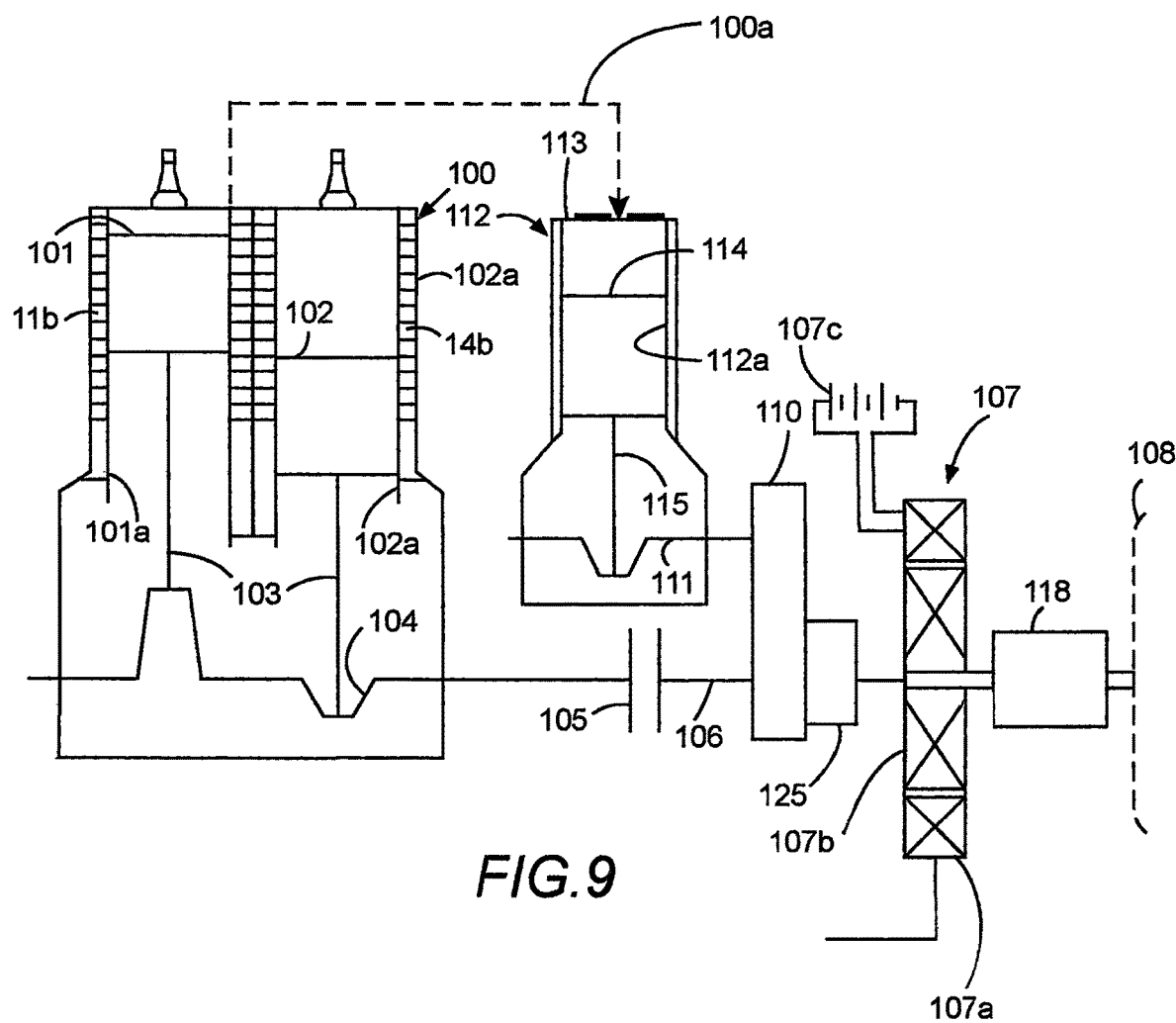
FIG. 9 is a schematic diagram showing another form of internal combustion waste heat recovery, adapted for use in a vehicle such as a car or truck.

Refer now to FIG. 9, which is a diagram showing the general layout of a more simply constructed high efficiency energy recovery drivetrain in accordance with the present invention. To recover waste heat, Rankine cycle vapor expander 112 having cylinder 112a, cylinder head 113 and piston 114 slidably mounted in cylinder 112a is joined by connecting rod 115 to impart rotation to crankshaft 111. Close to the expander 112 is internal combustion engine 100, having in this example two pistons 101 and 102 joined by connecting rods 103 to engine crankshaft 104 which is in turn coupled to driveshaft 106 by electromagnetic clutch 105 operated by an engine control unit (ECU not shown) to rotate magnetic rotor 107b of brushless motor-generator 107 having a ring of stator coils 107a surrounding magnetic rotor 107b. Driveshaft 106 also provides power to a load such as vehicle wheel hub 108 when clutch 105 is engaged by the ECU. Crankshaft 111 of expander 112 is connected through drive coupling 110 such as a gear drive to an overrunning clutch 125 which enables expander 112 to apply additional torque to shaft 106 when the RPM of coupling 110 reaches that of driveshaft 106. A dual-clutch non-slip automatic transmission 118 is connected to transfer power from driveshaft 106 to wheel hub 108. The dashed line 100a from the ICE to expander 112 indicates schematically how the flow of thermal energy from an engine coolant and a working fluid is transferred to expander 112 after being heated by the combustion chamber as it spirals upwardly through ducts 102a around the cylinders of engine 100 is then further heated by exhaust gas from engine 100 as described below before being admitted to drive expander 112.

When the invention of FIG. 9 is used in a vehicle and the load is removed so that the engine is temporarily not running or is idling, clutch 105 can be disengaged by the ECU, enabling crankshaft 111 of expander 112 or wheel connected to hub 108 to drive motor-generator 107 and provide regenerative braking for charging battery 107c. To begin charging battery 107c, the ECU is programmed to complete an electric circuit between motor-generator stator coils 107a and battery 107c as soon as the load is removed from the engine. However when the vehicle is cruising on a highway under somewhat steady conditions, the electric circuit between stator coils 107a and battery 107c is held open by the ECU, cutting off the flow of current while clutch 105 is engaged enabling vapor expander 112 to apply torque by a direct mechanical connection through driveshaft 106 to drive wheel hub 108 or other load with an efficiency approaching 100% thereby avoiding losses of around 15 percent that would otherwise result if motor-generator 107 were connected to charge a battery that is later used to run motor-generator 107. Regenerative braking can be used whenever the vehicle slows down or the brakes are applied as the ECU connects motor-generator 107 to battery 107c for later use by motor-generator 107 to power the vehicle. When engine 100 and expander 112 are to be used together to power the vehicle, the electrical circuit to stator coils 107a is turned off by the ECU. This makes it possible for efficient transfer of mechanical energy produced by ICE 100 and expander 112 to transmission 118 without mechanically disconnecting rotor 107b as the expander crankshaft continues to revolve the rotor which then functions as a flywheel without generating current.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A powerplant comprising:
an internal combustion engine including an engine crankshaft;
a driveshaft operably coupling the engine crankshaft to a load;
a vapor expander, the vapor expander comprising:
a vapor expander crankshaft;
a vapor expander cylinder;
a vapor expander piston slidable on the vapor expander cylinder and operably coupled to the vapor expander crankshaft, the vapor expander receiving waste heat energy from the internal combustion engine;
an electric generator having a plurality of stator coils and a rotor, the electric generator being operatively coupled with the vapor expander crankshaft;
a clutch operatively coupling the engine driveshaft to the electric generator and load;
at least one electrical controller adapted to engage and disengage the clutch depending on operating conditions of the powerplant;
wherein the combustion engine alone can power the load while the clutch is engaged;
wherein both the vapor expander and the internal combustion engine power the load through the driveshaft by connecting the vapor expander crankshaft to the driveshaft through a one-way clutch thereby enabling the vapor expander to be inactive while the engine is operating and;
wherein when the engine is stopped or idling, the controller is adapted to disengage the clutch coupling the engine driveshaft to the load while the vapor expander powers the electric generator through the one-way clutch to provide current to a member selected from the group consisting of a battery and accessory operation while the vapor expander receives pressurized vapor, thereby reducing a loss of the waste heat energy that has been recovered.

2. The powerplant of claim 1, wherein the powerplant is part of a motor vehicle having at least two wheels, the driveshaft driving at least one of the two wheels, wherein the vapor expander crankshaft applies torque through the clutch to the load, thereby enabling energy produced by both the internal combustion engine and the vapor expander to be transferred to the at least one wheel, and wherein when the load is removed and when the clutch is engaged, momentum energy of the motor vehicle is transferred from the at least one wheel to drive the electric generator to provide regenerative braking as the motor vehicle decelerates.

3. The powerplant of claim 2, wherein the electric generator is a motor-generator operatively coupled to drive the at least one wheel, and wherein the powerplant further comprises an electric battery chargeable by the motor-generator.

4. The powerplant of claim 1, further comprising a second clutch between the vapor expander and the driveshaft, and a third clutch between a motor-generator and the driveshaft.

5. A powerplant comprising:
an internal combustion engine including an engine crankshaft;
a driveshaft operably coupling the engine crankshaft to a load;
a vapor expander, the vapor expander comprising:
a vapor expander crankshaft;
a vapor expander cylinder;
a vapor expander piston slidable on the vapor expander cylinder and operably coupled to the vapor expander crankshaft, the vapor expander receiving waste heat energy from the internal combustion engine;
an electric generator having a plurality of stator coils and a rotor, the electric generator being operatively coupled with the vapor expander crankshaft;
a clutch operatively coupling the engine driveshaft and the electric generator; and
an electrical controller adapted to engage and disengage the clutch depending on operating conditions of the powerplant and,
wherein a vapor expansion chamber of the vapor expander is disposed between the vapor expander piston and a vapor expander cylinder head, the vapor expander cylinder head being supported in a fixed position by an engine block of the internal combustion engine.

6. A powerplant comprising:
an internal combustion engine including an engine crankshaft;
a driveshaft operably coupling the engine crankshaft to a load;
a vapor expander, the vapor expander comprising:
a vapor expander crankshaft;
a vapor expander cylinder;
a vapor expander piston slidable on the vapor expander cylinder and operably coupled to the vapor expander crankshaft, the vapor expander receiving waste heat energy from the internal combustion engine;
an electric generator having a plurality of stator coils and a rotor, the electric generator being operatively coupled with the vapor expander crankshaft;
a clutch operatively coupling the engine driveshaft and the electric generator; and
an electrical controller adapted to engage and disengage the clutch depending on operating conditions of the powerplant, wherein the powerplant vapor expander piston comprises a double-acting piston slidably disposed in an engine cylinder supported by an engine block of the internal combustion engine, the internal combustion engine having a combustion chamber defined by the double acting piston and a cylinder head of the internal combustion engine, the vapor expander including a vapor expander cylinder head supported by the engine block, a vapor expansion chamber king disposed within the double-acting piston and defined by the vapor expander cylinder head and the vapor expander piston.

7. The powerplant of claim 6, wherein the vapor expander cylinder head includes a vapor inlet valve and a vapor exhaust valve, and wherein at least one of the vapor inlet valve and the vapor exhaust valve is yieldably biased during operation by pressurized vapor.

8. The powerplant of claim 7, further comprising an electronic control unit having a cutoff timing regulator operatively coupled to the vapor inlet valve.

9. The powerplant of claim 8, wherein the electronic control unit enables selection of a closing time of the vapor inlet valve by controlling pressure in a cavity in fluid communication with the vapor inlet valve.

10. A vehicle comprising:
a vehicle framework supported by at least two wheels;
an internal combustion engine;
a vapor expander having a vapor expander cylinder with a piston slidably mounted thereon and a vapor expansion chamber defined by the piston and the vapor expander cylinder, the vapor expansion chamber being connected to receive vapor heated by waste thermal energy from the internal combustion engine;
a one-way clutch operatively coupling the vapor expander to drive at least one of the at least two wheels;
a second clutch connected between the internal combustion engine and the at least one wheel;
an electronic controller operatively connected to the internal combustion engine and to the vapor expander such that the controller regulates power supplied to the at least one wheel, whereby the vapor expander and the internal combustion engine simultaneously, as well as independently, drive the at least one wheel of the vehicle and;
wherein the internal combustion engine has at least one inlet valve and at least one exhaust valve and,
wherein the electronic controller is operatively connected to time independent operation of the combustion inlet and combustion exhaust valve and to deactivate operation of at least one of the internal combustion valves at selected times when the load on the internal combustion engine is reduced.

11. A vehicle comprising:
a vehicle framework supported by at least two wheels;
an internal combustion engine;
a vapor expander having a vapor expander cylinder with a piston slidably mounted thereon and a vapor expansion chamber defined by the piston and the vapor expander cylinder, the vapor expansion chamber being connected to receive vapor heated by waste thermal energy from the internal combustion engine;
a one-way clutch operatively coupling the vapor expander to drive at least one of the at least two wheels;
a second clutch connected between the internal combustion engine and the at least one wheel;
a power output controller operatively connected to at least one member selected from the group consisting of the internal combustion engine and the vapor expander such that the power output controller regulates power suppled to the at least one wheel, whereby the vapor expander and the internal combustion engine simultaneously, as well as independently, drive the at least one wheel of the vehicle,
wherein the piston is operatively coupled to impart rotation to a generator and,
wherein the vapor expander includes a vapor expander cylinder head having a pair of valves comprising a vapor inlet valve and a vapor exhaust valve communicating with the vapor expansion chamber, and further comprising at least one timing adjustment element to regulate the closing time of the vapor inlet valve relative to the location of the piston in the cylinder.

12. The vehicle of claim 11, wherein a driveshaft is operatively coupled between the internal combustion engine and the at least one wheel, and a dual clutch transmission is connected between the driveshaft and the at least one wheel.

13. An energy generating and transfer apparatus for waste heat recovery to power an output shaft for imparting mechanical work to a load, the apparatus comprising:
an internal combustion engine having an engine block supporting an engine cylinder, an engine piston slidably received in the engine cylinder, and a driveshaft;
a vapor expander operatively associated for receiving waste heat energy from the internal combustion engine and to convert to the waste heat energy to mechanical work by imparting rotation to an output member, the vapor expander comprising a vapor expander cylinder with a vapor expander cylinder head at an outward end thereof, the vapor expander cylinder head being supported from the engine block, a vapor expander piston slidably received upon the vapor expander cylinder and the vapor expander cylinder head, the vapor expander piston defining a vapor expansion chamber, a vapor inlet valve and a vapor exhaust valve being supported within the vapor expander cylinder head, each such vapor inlet valve and vapor exhaust valve being biased during operation to a predetermined position, each vapor inlet valve and vapor exhaust valve having a valve actuator extending outwardly therefrom for sliding into a recess in the crown of the engine piston to thereby impart inward movement to actuate each vapor inlet valve and vapor exhaust valve by piston motion as the engine piston approaches a bottom dead center position.

14. The apparatus of claim 13, wherein the apparatus is mounted in a motor vehicle having at least two wheels, the vehicle being powered by the internal combustion engine coupled to drive at least one wheel of the vehicle, and wherein the vapor expander is powered by vapor heated by waste beat from a coolant of the internal combustion engine and by waste heat from internal combustion exhaust gas, and the vapor expander is operatively associated to drive at least one of the vehicle wheels.

15. An energy generating and transfer system for waste heat recovery, the system comprising:
an internal combustion engine having at least one cylinder with a piston slidably mounted therein that is connected to an engine crankshaft for applying torque to a load;
a vapor expander operatively associated with the internal combustion engine to produce mechanical energy from waste heat recovered from the internal combustion engine, the vapor expander having a vapor expander cylinder and a vapor expander piston slidably mounted therein that is connected to a vapor expander crankshaft;

an electric generator having a rotatable magnetic rotor connected to the vapor expander crankshaft, the generator having at least one stator coil; and a controller connected to operate a clutch for transmitting power from the vapor expander crankshaft to a rotatable driving element for applying torque to the load, the controller being arranged to open an electrical circuit through the stator coils of the generator when the clutch is engaged thereby cutting off the flow of current from the generator, whereby the vapor expander produces increased mechanical power through the clutch to drive the load during a rotation of the rotor.

16. The system of claim 15, wherein the rotatable driving element for applying torque to a load is coupled by a mechanical drive member to the engine crankshaft such that both the internal combustion engine and the vapor expander thereby apply power to the load simultaneously.

17. The system of claim 15, wherein the energy generating and transfer system is mounted in a motor vehicle that is supported by at least two wheels, the engine crankshaft is operatively connected to drive at least one of the wheels for imparting motion to the vehicle and a mechanical connection from the expander crankshaft applies torque through the clutch to the engine crankshaft, enabling substantially all of, the energy produced by both the internal combustion engine and the vapor expander to be transferred to the at least one of the vehicle wheels, whereby momentum energy of the vehicle can be transferred by a mechanical connection from the at least one wheel to drive the generator for providing regenerative braking while the clutch is engaged.

18. An energy generating and transfer apparatus for waste heat recovery comprising:
an internal combustion engine having at least one cylinder with a double acting slidably mounted therein connected to drive a crankshaft, the cylinder having a combustion chamber on one side of the piston and an expansion chamber on the other side thereof powered by pressurized vapor heated by waste heat from the engine;
an electric generator releasably connected to be driven by the crankshaft connected to the double acting piston; and
a controller operatively associated with the engine to disable at least one combustion inlet valve and at least one combustion exhaust valve when the double acting piston crankshaft is connected to drive the electric generator, thereby reducing a drag force from the engine acting upon the motion of the double acting piston.

19. An energy generating and transfer apparatus for waste heat recovery comprising, an internal combustion engine having a driveshaft for connecting the engine to a load and a Rankine cycle vapor expander having a crankshaft and a cylinder with a piston slidably mounted therein for imparting rotation to the expander crankshaft, the expander being operatively associated to receive waste heat energy from the internal combustion engine and to convert the waste heat energy to mechanical work, the internal combustion engine having at least one inlet valve and at least one exhaust valve and an electronic controller operatively connected to time independent operation of the inlet and the exhaust valve and to deactivate operation of at least one of the internal combustion valves at selected times and,
wherein at least one internal combustion valve is opened by a valve body connected thereto that is regulated by the electronic controller and the at least one internal combustion valve is closed by an electromagnet that is regulated by the electronic controller.

20. The apparatus of claim 19 wherein the electronic controller is operatively connected to regulate at least one of the opening and the closing of at least one of the internal combustion valves and to deactivate at least one of the internal combustion valves when the load on the internal combustion engine is reduced.

21. A powerplant comprising,
an internal combustion engine with at least one cylinder,
the cylinder having a double acting piston slidably mounted therein between a combustion chamber in the cylinder outward of the piston that is powered by the combustion of fuel and an inward vapor expansion chamber in the cylinder powered by pressurized vapor that is heated by waste combustion heat from the internal combustion engine,
the piston being operatively connected to a rotatable engine crankshaft that is operatively associated for applying torque to a load,
an inner cylinder head that is supported in a fixed position in the engine and is located within the double acting piston of the powerplant,
a vapor inlet valve and a vapor exhaust valve in the inner cylinder head,
at least one of said valves being biased outwardly from the inner cylinder head by an outward force applied to the at least one valve by the pressurized vapor conveyed within the inner cylinder head, the pressurized vapor in the inner cylinder head also being conveyed to the inlet valve to pressurize the vapor expansion chamber when the inlet valve is opened and,
wherein at least one of the vapor inlet and vapor exhaust valves is actuated by an inward motion of the piston as the crankshaft rotates.

22. The powerplant of claim 21 wherein at least one of the vapor inlet valve and the vapor exhaust valve is provided with an actuator positioned thereon to enter a recess in the piston to thereby develop pressure in the recess for actuating the at least one valve by piston motion.

23. The powerplant of claim 21 wherein the combustion chamber and the vapor expansion chamber are surrounded by a helical duct for heating a liquid coolant during a spiral flow of the liquid coolant through the duct surrounding the combustion chamber and vapor expansion chamber.

24. The powerplant of claim 21 including an electronic controller adapted to disable at least one of an internal combustion engine inlet valve and an internal combustion exhaust valve when the load on the internal combustion engine is reduced thereby reducing a drag force from the internal combustion engine acting upon the motion of the double acting piston.

25. The powerplant of claim 21, wherein the internal combustion engine has at least one combustion inlet valve and at least one combustion exhaust valve and wherein operation of at least one valve of said powerplant is timed by an electronic engine controller.

26. The powerplant of claim 21 further comprising an electric control unit having a cutoff timing regulator operatively coupled to the vapor inlet valve.

\* \* \* \* \*